United States Patent

Martin

[15] 3,687,987
[45] Aug. 29, 1972

[54] SUBSTITUTED CHALCOGENO DERIVATIVES OF TETRACYANOQUINODIMETHANS

[72] Inventor: Elmore L. Martin, Wilmington, Del.

[73] Assignee: E. I. du Pont de Nemours and Co.

[22] Filed: April 7, 1969

[21] Appl. No.: 814,185

Related U.S. Application Data

[63] Continuation-in-part of Ser. No. 514,385, Dec. 16, 1965, Pat. No. 3,504,001.

[52] U.S. Cl............260/396 N, 260/340.3, 260/464, 260/465 F, 260/465 H, 260/613, 260/41
[51] Int. Cl..............................................C07c 49/62
[58] Field of Search................................260/396 N

[56] References Cited

UNITED STATES PATENTS

| | | | |
|---|---|---|---|
| 3,115,506 | 12/1963 | Acker et al.................. | 260/396 |
| 3,162,641 | 12/1964 | Acker et al............. | 260/396 X |
| 3,408,367 | 10/1968 | Andreades.................. | 260/396 |
| 3,526,497 | 9/1970 | Obreiter................. | 260/396 X |

*Primary Examiner*—Nicholas S. Rizzo
*Assistant Examiner*—James H. Turnipseed
*Attorney*—James H. Ryan

[57] ABSTRACT

Described and claimed are variously substituted chalcogeno tetracyanoquinodimethans of the formula

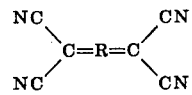

wherein R may be

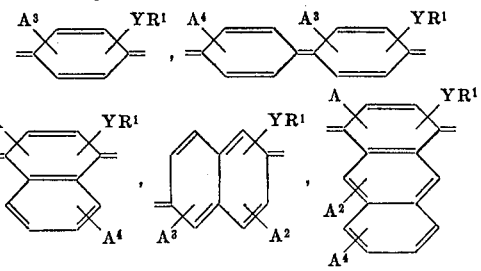

and

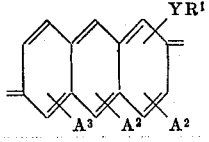

Y is oxygen or sulfur; and $R^1$ and $A - A^4$ are any of numerous organic substituents.

The substituted tetracyanoquinodimethans of this invention, upon reaction with organic or organoinorganic Lewis bases, are converted to useful paramagnetic charge-transfer compounds; further, the compounds of this invention all form yellow complexes with aromatic compounds and are useful in dyeing polystyrene.

15 Claims, No Drawings

SUBSTITUTED CHALCOGENO DERIVATIVES OF TETRACYANOQUINODIMETHANS

CROSS-REFERENCE TO RELATED APPLICATION

This application is a continuation-in-part of my copending application Ser. No. 514,385, filed Dec. 16, 1965, issued as U.S. Pat. No. 3,504,001 on Mar. 31, 1970.

SUMMARY AND DETAILS OF THE INVENTION

This invention relates to substituted chalcogeno tetracyanoquinodimethans of the formula

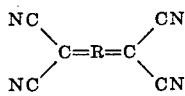

wherein R may be

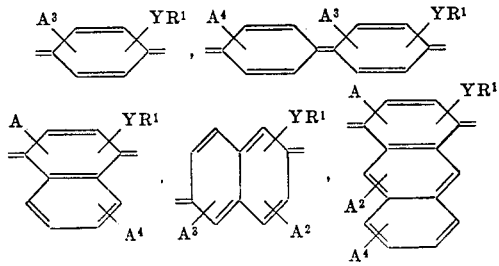

and

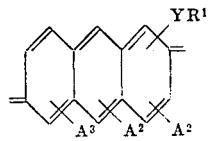

Y is O or S;

$R^1$ is hydrocarbyl of 1—18 carbon atoms (including alkyl and aryl), alkoxyloweralkyl, carboxyloweralkyl or vinyl; and A is hydrogen, $YR^1$, alkyl, aryl, halogen, nitrile, halohydrocarbyl, hydrocarbyloxycarbonyl, arylsulfonyl, vinyl or —$CONR^2R^3$, $R^2$ and $R^3$ being hydrogen or alkyl of 1—6 carbon atoms with the proviso that $YR^1$ and A connected to adjacent carbon atoms in the same ring may be taken together to represent the diradicals —O—$R^7$—O— or —O—$R^7$—O—$R^8$— in which $R^7$ and $R^8$ are alkylene or substituted alkylene radicals containing up to eight carbon atoms each, with the two bonds of each alkylene group stemming from the same carbon or from adjacent carbons and in which the substituents may be lower alkyl, haloloweralkyl, loweralkoxy, carboxy, phenyl or halophenyl. In any compound the A's may be alike or different.

In the foregoing definition of A, alkyl is free of ethylenic or acetylenic unsaturation and may contain 1–18 (preferably 1–8, and more preferably 1–6) carbon atoms, aryl may contain 6–18 (preferably 6–12) carbon atoms, the hydrocarbyl terms are preferably alkyl or aryl and may contain 1-18 (and preferably 1–6) carbon atoms and halogen is preferably fluorine, chlorine, bromine or iodine.

The process for preparing the tetracyanoquinodimethans of this invention is depicted generically by the following equation:

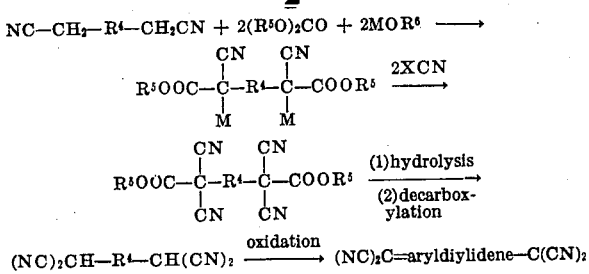

The process involves the reaction of the requisite diacetonitrile having two hydrogens on each α-carbon with suitable carboalkoxylation reagents, e.g., with a dihydrocarbyl carbonate [$(R^5O)_2CO$], in the presence of an alkali metal or alkaline earth metal hydrocarbyl oxide ($MOR^6$) to form the corresponding metal derivative of the intermediate dihydrocarbyl biscyanoacetate. This intermediate product is reacted under normal metathetical conditions with a cyanogen halide, e.g., chloride or bromide (XCN), to effect insertion of a second cyano group on each α-carbon, thereby forming the next intermediate product, a dihydrocarbyl bis(dicyanoacetate) ester. These esters, upon aqueous base hydrolysis, are converted to the corresponding salts of the free acids which in turn, on acidification with strong aqueous acids, spontaneously decarboxylate to form the desired malononitriles.

$R^4$ is used to represent arylene containing at least one $YR^1$ substituent and other substituents A as defined above; $R^5$ is used to represent hydrocarbyl generally of up to 10 carbon atoms, preferably alkyl; and $R^6$ is used to represent hydrocarbyl groups, the same or different from $R^5$, again generally of up to 10 carbons and preferably alkyl; M represents an alkali metal or alkaline earth metal of atomic number 3—56, inclusive, usually of atomic number from 3–20, inclusive, and most especially an alkali metal of atomic number from 11–19, inclusive; X is used to represent a halogen of atomic number from 17–53, inclusive, and preferably of atomic number from 17–35, inclusive.

The substituents specifically contemplated in R and $R^4$ include alkyl, aryl, halogen (fluorine, chlorine, bromine, or iodine), alkoxy, aryloxy, nitrile, halohydrocarbyl, hydrocarbyloxy-carbonyl, alkylmercapto, arylmercapto,

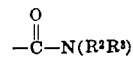

arylsulfonyl, vinyl and vinyloxy. Hydrocarbyl in these substituents is preferably alkyl.

More specifically, the $R^4$ group represents paraarylene whether the para positions are in the same ring or separated by two rings or more, i.e., para-arylene includes p-phenylene; p,p'-diphenylene, 2,6-naphthalenes, 2,6-anthracenes, 1,4-anthracenes and the like. Thus, in the embodiment represented by the equations above, aryldiylidene represents a quinoid conjugated bis(divalent) system.

The term "aryldiylidene" or "ardiylidene" is possibly not the best nomenclature for the bridging diradical involved. An alternative and possibly more technically adequate descriptive term would be or cyclodienediylidene"or "unsubstituted and substituted cyclohexadienediylidene." The only requisite for this bridging radical is that there be present therein at least one sixmembered quinoid conjugated ring containing two immediately linked exocyclic, conjugated double bonds.

The process by which the compounds of the present invention are prepared is particularly outstanding in that it is readily achieved with simple, relatively low-cost and commercially available materials and involves no special equipment requirements. Each step of the foregoing described stoichiometry is effected in high yield and high purity under relatively mild reaction conditions. Most surprisingly, the entire process, which may be regarded as requiring four reaction steps, can be effected sequentially in the same reactor without isolation of any intermediate product or removal of any by-product other than methanol. This is quite surprising for any multi-step chemical reaction and such is particularly true in the case of the tetracyanoquinodimethans whose chemical intermediates generally must be of high purity if a product of desirable purity is to be obtained.

The first reaction step involves insertion of an ester group on a carbon carrying two hydrogens directly linked to a nitrile. This is effected by direct carboalkoxylation, for instance with a hydrocarbyl carbonate (such as dimethyl-, dioctyl- or dibutyl carbonate) and an alkali metal or alkaline earth metal hydrocarbyloxide such as sodium-, cesium-, or calcium methoxide, ethoxide, decyloxide. Normally, this reaction will be effected in the presence of an inert organic diluent or a reaction medium which is present solely to effect adequate mixing of the dihydrogen-bearing acetonitrile and the esterifying coreactants. A particularly preferred class of such reaction media comprises the organic hydrocarbons, both alkyl and aryl, with preference for the latter. The only reason for choosing one such reaction medium over another is that of boiling point. In the ester insertion reaction an alcohol is necessarily formed in molar proportions in accord with the stoichiometry. To assure maximum completion of the desired reaction said alcohol should be removed from the reaction medium. This is most conveniently achieved by carrying out the reaction at reflux of the hydrocarbon/alcohol binary reaction medium being used. Portions thereof are suitably removed as the reaction is completed until all of said binary is distilled away.

The next step of the reaction is a direct metathesis between the first formed dialkali or alkaline earth metal derivative of the α-cyano-substituted acetate ester and a halonitrile, e.g., cyanogen chloride or cyanogen bromide. This reaction is normally effected without the addition of any further reaction medium over that remaining from the first esterification step. Equivalent stoichiometric quantities of an alkali metal or alkaline earth metal halide are formed. The by-product salt may be removed from the reaction zone by direct treatment with water, but is normally left there in suspension in the mixture.

The next two steps in the synthesis, i.e., the hydrolysis and decarboxylation steps, involve (1) the addition of equivalent stoichiometric portions of a strong base, most conveniently an alkali metal or alkaline earth metal hydroxide such as sodium, potassium or calcium hydroxide, in aqueous solution, and (2) acidification with an equivalent stoichiometric amount of a strong acid, most conveniently a strong mineral acid (such as HCl HBr, or HI) in aqueous solution. The reaction times involved in these two steps are extremely short encompassing in each instance from as short a time as a few seconds to at most a few minutes. Accordingly, the two can be regarded as essentially a single step, although they must necessarily be carried out sequentially.

The additional step leading to the tetracyanoquinodimethans is an oxidation step and has been described in U.S. Pat. No. 3,115,506. Conventional oxidizing agents are used such as bromine, chlorine, nitric acid (usually in admixture with another strong mineral acid such as HCl).

Reaction temperatures and times are generally modest and geared to practical syntheses. The highest temperatures and longest reaction times would be involved in the carboalkoxylation of the α,α-dihydrogen-bearing acetonitrile. This reaction may be effected in the broad temperature range 25°–200° C. and preferably in the range from 60–125° C. This reaction will normally be effected with excess quantities of an inert organic diluent such as a hydrocarbon or a hydrocarbon ether or a hydrocarbon ester or the like. Frequently it also may involve excess quantities of the esterifying agent to assure maximum conversion. Molar proportions of a hydrocarbylhydroxy compound, for instance, an alcohol, result from combination of one of the α-hydrogens of the acetonitrile reactant and one of the ester moieties of the esterifying reagent. A preferred reaction medium will therefore be one which forms with the hydroxyhydrocarbyl compound produced a binary azeotrope which may be distilled from the reaction medium mixture assuring the completion of the esterification reaction.

The second step, i.e., the metathetical reaction with the cyanogen halide, results in the insertion of the second nitrile group on the α-carbon. This will normally be initiated at reduced temperatures in the range 5°–20 C. due to the relatively low boiling points of the cyanogen halide reactants. Once the cyanogen halide has been charged to the reaction zone and the original exothermic reaction is over, the reaction mixture will normally be heated to temperatures generally below about 100° C. and practically in the range 50–75° C. This is to assure as far as possible the completion of the metathetical reaction.

The hydrolysis and decarboxylation steps need generally only be carried out at room temperature. If required, elevated temperatures in the range from 30° to 100° C. can be used. The final oxidation step will also normally be effected at ambient or room temperatures, although, if desired, modestly elevated temperatures, again in the range of 30°–100° C. can be used.

Although it has been pointed out that one of the most outstanding properties of the present synthesis is that all steps can be carried out sequentially in the same reactor without isolating any of the intermediate products or removing any of the by-products, it is within the purview of this invention that the various process steps be carried out separately with isolation of each of the intermediates. Under either procedure the overall process operates at extremely high yields ranging from 85 percent of theoretical or higher to form products either at the intermediate steps or at the final product level of extremely high purity.

EMBODIMENTS OF THE INVENTION

There follow some nonlimiting examples illustrative of the present invention. In every instance parts are by weight and temperatures, unless otherwise specified, are in °C.

EXAMPLE 1

7,7,8,8-TETRACYANO-2,5-DIMETHOXYQUIN-ODIMETHAN

Part A 2,5-Dimethoxy-1,4-xylylene Dichloride

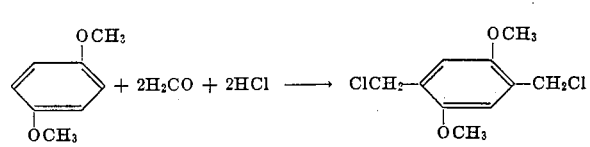

A slow stream of hydrogen chloride was passed into a mechanically stirred mixture of 82 g. (0.6 mole) of p-dimethoxybenzene, 45 g. (1.5 moles) of the paraformaldehyde, 100 ml. of glacial acetic acid and 200 ml. of concentrated hydrochloric acid at 50°–55° C. for a period of 2 hours. It was necessary to cool the reaction mixture externally until the exothermic reaction ceased. Crystals of the dichloride started to separate within about 15 minutes after the start of the reaction, and at the end of 2 hours, a crystalline, thick reaction mass was obtained. The reaction product was collected by suction filtration and washed with about 2 l. of cold water. The moist filter cake was dissolved in about 2 l. of methylene chloride and the organic layer was treated with decolorizing charcoal and anhydrous magnesium sulfate. The resulting colorless filtrate was concentrated to a thick paste of colorless crystals, the mixture was cooled to 0° C., the dichloride was collected, washed with cold methylene chloride and after air-drying, dried under pressure over phosphorus pentoxide-potassium hydroxide. The yield of colorless crystals, m.p. 167°–169° C., was 90–92 g. (64–65 percent).

Anal. Calcd. for: $C_{10}H_{12}O_2Cl_2$: C, 51.08; H, 5.15; Cl, 30.16

Found: C, 50.88; H, 5.32; Cl, 30.27.

Part B 2,5-Dimethoxy-1,4-xylylene Dicyanide

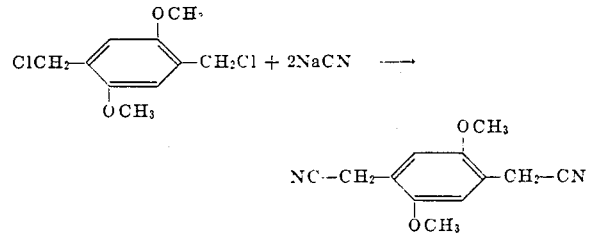

To a mechanically stirred suspension of 35 g. (0.7 mole) of sodium cyanide in 200 ml. of dimethyl sulfoxide was added in small portions 71 g. (0.3 mole) of 2,5-dimethoxy-1,4-xylylene dichloride. The temperature was maintained at 50° C. by controlling the rate of addition of the dichloride and by means of external cooling. The reaction mixture was maintained at 50° C. for an additional hour after the addition of the dichloride was completed and then the temperature was increased to 85° C. for 5 minutes. After cooling to about 40° C., the reaction mixture was diluted to a volume of about 1 liter, and the precipitated dinitrile was collected and washed with water until essentially neutral. The moist filter cake was dissolved in about 2 liters of methylene chloride, the organic layer was dried and concentrated until a thick paste of crystals was obtained. After cooling to room temperature, the dinitrile was collected and washed in turn with methylene chloride and ether. After drying under reduced pressure over phosphorus pentoxide at 50° C., there was obtained 51 g. (81%) of 2,5-dimethoxy-1,4-xylylene dicyanide, m.p. 198°–200° C.

Anal. Calcd. for: $C_{12}H_{12}O_2N_2$: C, 66.65; H, 5.59; N, 12.96.

Found: C, 66.53; H, 5.35; N, 13.00.

Part C Dimethyl α,α,α'α-Tetracyano-2,5-dimethoxy-1,4,α,α_{0030}

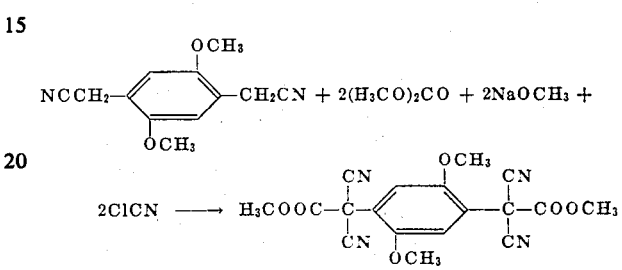

A mechanically stirred mixture of 43 g. (0.2 mole) of 2,5-dimethoxy-1,4250 ml. (2.5 moles) of dimethyl carbonate and 27 g. (0.5 mole) of sodium methoxide was warmed to 70° C. whereupon a spontaneous reaction occurred, the temperature increased to 80° C., the sodium methoxide partially dissolved and after a few minutes a solid began to precipitate. About 50 ml. of benzene was added and the reaction mixture was refluxed for 3 hours. The benzene-methanol binary was removed by distillation during the course of 1 hour, additional benzene being added as required. The suspension of the disodium derivative of dimethyl α,α'-dicyano-2,5-dimethoxy-1,4-phenylenediacetate was cooled to 5° C. and 35 ml. of cyanogen chloride was distilled into the reaction mixture at 5°–10° C. After a slight exothermic reaction, the temperature was increased to 65° C. during the course of about 2 hours. After stirring overnight at room temperature, the temperature of the reaction mixture was increased to 50° C., and the reaction mixture was evaporated to dryness under reduced pressure in a bath at 50°–60° C. The solid residue of dimethyl α,α,α',α'-tetracyano- 2,5-dimethoxy-1,4-phenylenediacetate and sodium chloride was stirred in a blender with cold water. The crude ester was collected, washed with cold water and the moist filter cake was dissolved in methylene chloride. The organic layer was treated with decolorizing carbon and anhydrous magnesium sulfate, and the filtrate was concentrated until crystals began to separate. Addition of ether precipitated the tetracyanodiacetate. After cooling to −5°, the colorless crystals were collected, washed with cold ether and dried. The yield of compound melting at 200°–201° C. was 72 g. (95%). The n.m.r. spectrum in CDCl₃ showed two types of protons, one at 7.35 ppm (aromatic) and the other at 4.00 ppm (protons on methoxy groups), in the ratio of 1:6.

Anal. Calcd. for: $C_{18}H_{14}O_6N_4$: C, 56.54; H. 3.69; N, 14.66.

Found: C, 56.62; H, 3.85; N, 14.60.

Part D 1,4-Bis(dicyanomethyl)-2,5-dimethoxybenzene (TCNQ(OMe)₂H₂

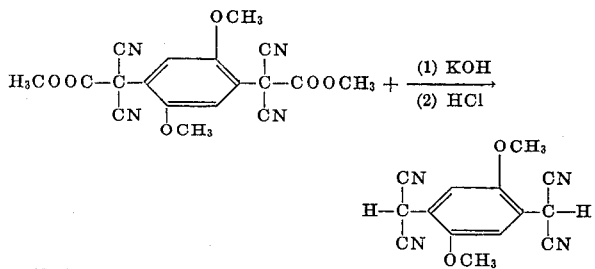

To 3.8 g. (0.01 mole) of dimethyl α,α,αα',α'-tetracyano-2,5-dimethoxy-1,4-phenylenediacetate was added 40 ml. of a 10 percent aqueous potassium hydroxide solution and the mixture was stirred until a homogeneous solution was obtained. The solution was acidified by the addition of 6N hydrochloric acid, and the crude 1,4-bis(dicyanomethyl)-2,5-dimethoxybenzene was collected by filtration and washed with cold water. The filter cake was dissolved in about 1 liter of methylene chloride, treated with decolorizing charcoal and concentrated to a small volume whereupon colorless crystals of the TCNQ(OMe)$_2$H$_2$ separated. The crystals were collected, washed with methylene chloride until colorless, and dried; m.p. 233°–235° C. with decomposition. The yield was 2.0–2.4 g. (75–90%).

Anal. Calcd. for: $C_{14}H_{10}O_2N_4$: C, 63.15; H, 3.78; N, 21.04.

Found: C, 62.92; H, 3.65; N, 20.82.

Part E  7,7,8,8-Tetracyano-2,5-dimethoxyquinodimethan TCNQ(OMe)$_2$

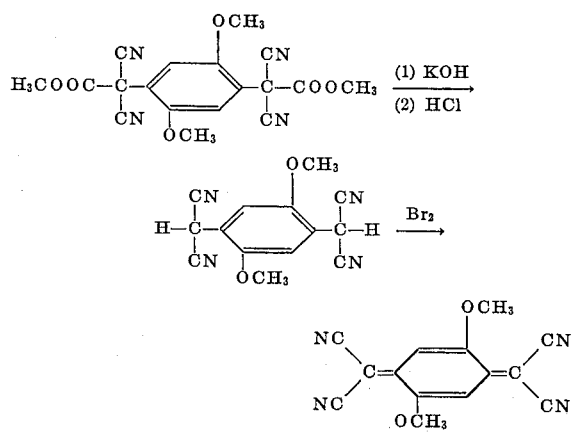

The dimethyl α,α,α',α'-tetracyano-2,5-dimethoxy-1,4-phenylenediacetate was converted to the TCNQ(OMe)$_2$H$_2$ as described above and a slight excess of bromine water was added to the suspension of the dihydro compound. The resulting red product was collected, washed with cold water and dissolved in about 600 ml. of methylene chloride. The organic layer was dried, treated with decolorizing charcoal and concentrated to a small volume whereupon deep red crystals of TCNQ(OMe)$_2$ separated. The crystals were collected, washed with methylene chloride and dried. The yield was 2.2 – 2.6 g. (83–98 percent), and the compound melts at 300°–305°C. with decomposition.

Anal. Calcd. for: $C_{14}H_8O_2N_4$: C, 63.64; H, 3.05; N, 21.20. 37 formalin,

Found: C, 63.32; H, 2.85; N, 21.22.

EXAMPLE 2

7,7,8,8-TETRACYANO-2,5-DIETHOXYQUINODIMETHAN  Part A  2,5-Diethoxy-1,4-xylylene Dichloride

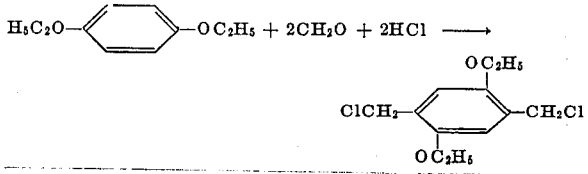

The dichloride was prepared by the procedure of Example 1, Part A. One hundred (100) g. (0.6 mole) of 1,4-diethoxybenzene, 160 g. (2.0 moles) of 37 percent formalin, 100 ml. of glacial acetic acid and 200 ml. of concentrated hydrochloric acid gave 112–120 g. (71–76%) of colorless needles, m.p. 154°–156° C.

Anal. Calcd. for: $C_{12}H_{16}O_2Cl_2$: C, 54.76; H, 6.13; Cl, 26.95.

Found: C, 54.55; H, 6.42; Cl, 26.92.

Part B  2,5-Diethoxy-1,4-xylylene Dicyanide

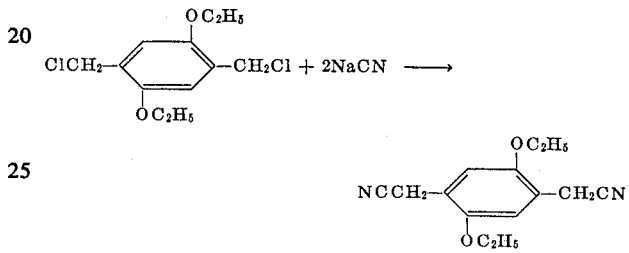

The dicyanide was prepared by the procedure of Example I, Part B. Seventy-nine (79) g. (0.3 mole) of 2,5-diethoxy-1,4-xylylene dichloride, 35 g. (0.66 mole) of sodium cyanide and 200 ml. of dimethyl sulfoxide gave 60 g. (82 percent) of colorless crystals, m.p. 182°–184° C. after crystallization from methylene chloride.

Anal. Calcd. for: $C_{14}H_{16}O_2N_2$: C, 68.83; H, 6.60; N, 11.47.

Found: C, 68.69; H, 6.52; N, 11.07.

Part C  Dimethyl α,α,α',α'-Tetracyano-2,5-diethoxy-1,4-phenylenediacetate

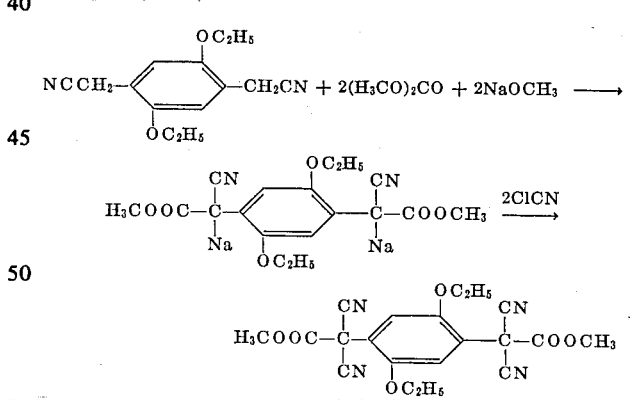

A mechanically stirred mixture of 48.8 g. (0.2 mole) of 2,5-diethoxy-1,4-xylylene dicyanide, 250 ml. of dimethyl carbonate and 27 g. (0.5 mole) of sodium methoxide was warmed in a water bath to 80° C. whereupon a nearly homogeneous solution was obtained and shortly thereafter the disodium derivative of dimethyl α,α'-dicyano-2,5-diethoxy-1,4-phenylenediacetate began to precipitate. The temperature of the reaction mixture dropped from 85° to 74° C. during the course of about 3 hours. The methanol was removed from the reaction mixture by the addition of benzene and distillation of the benzene-methanol binary. The resulting suspension was cooled to 5° C. and 35 ml. of cyanogen chloride was distilled into the reaction mixture at 5°–10° C. After a slight exothermic reaction, the temperature was increased to 40° C. during the course of about 2 hours. After stirring overnight at room temperature, the temperature was increased to 50° C. and the reaction mixture was evaporated to dryness under reduced pressure in a bath at 50°–60° C. The solid residue was stirred in a blender with cold water, filtered, washed with cold water, and the moist filter cake was dissolved in methylene chloride. After drying and treating with decolorizing charcoal, the organic layer was concentrated until the internal temperature was 50° C. Ether was added slowly whereupon the dimethyl α,α,α′,α′-tetracyano-2,5-diethoxy-1,4-phenylenediacetate separated as nearly colorless crystals. After cooling to 5° C., the crystals were collected, washed with ether and dried; m.p. 159°–163°C The yield was 66 g. (81 percent). The n.m.r. spectrum in CDCl$_3$ showed three types of protons, singlet at 7.45 ppm. (aromatic), multiplet at 4.0–4.5 ppm. (methylene group of ethoxy and methoxy group of ester) and triplet centered at 1.5 ppm. (methyl group of ethoxy group) in the ratio of 1:5:3.

Anal. Calcd. for $C_{20}H_{18}O_6N_4$: C, 58.53; H, 4.42; N, 13.65.

Found: C, 58.69; H, 4.50; N, 13.34.

Part D. 1,4-Bis(dicyanomethyl)-2,5-diethoxybenzene (TCNQ(OEt)$_2$H$_{2d}$)

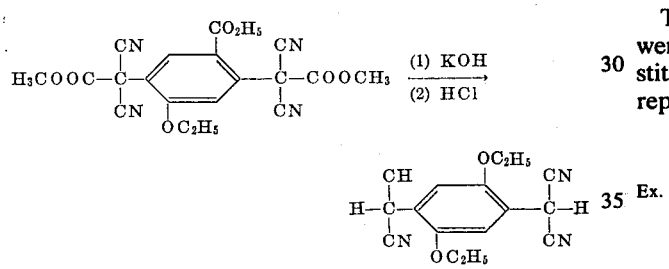

To 4.10 g. (0.01 mole) of dimethyl α,α,α′,α′-tetracyano-2,5-diethoxy-1,4-phenylenediacetate was added 40 ml. of a 10 percent aqueous potassium hydroxide solution and the mixture was warmed with stirring for a few minutes on a steam bath until a homogeneous solution was obtained. The solution was cooled by the addition of ice and acidified with 6N hydrochloric acid. The crude TCNQ(OEt)$_2$H$_2$ was collected and washed with cold water, and the moist filter cake was dissolved in about 100 ml. of methylene chloride. The organic layer was treated with decolorizing charcoal and anhydrous magnesium sulfate and, after filtration, was concentrated to a small volume whereupon colorless crystals separated. Ether was added slowly and the concentration was continued until a thick paste of crystals was obtained. After cooling, the crystals were collected, washed with ether and dried. The yield was 2.0–2.5 g. (67–85percent), m.p. 200°–201° C.

4: Calcd. for $C_{16}H_{14}O_2N_4$: c, 65.29; H, 4.80; N, 19,04
Found: C, 65.02: H, 4.56; N, 18.94

Part E. 7,7,8,8-Tetracyano-2,5-diethoxyquinodimethan (TCNQ(OEt)$_2$)

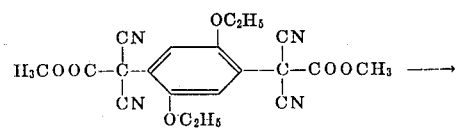

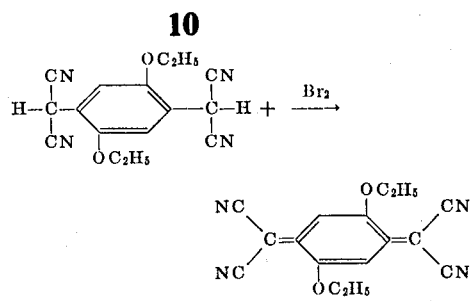

The dimethyl α, α, α′, α′-tetracyano-2,5-diethoxy-1,4-phenylenediacetate was converted to TCNQ(OEt)$_2$H$_2$ as described above and oxidized to TCNQ(OEt)$_2$ by the addition of a slight excess of bromine water. The resulting red compound was collected by filtration and washed with water, and the moist filter cake was dissolved in methylene chloride. The organic layer was dried, treated with decolorizing charcoal and concentrated to a small volume whereupon bright red crystals separated. After cooling, the crystals were collected, washed with ether and dried. The yield of TCNQ(OEt)$_2$ melting at 247°–248° C. was 2.4–2.6 g. (82–90percent).

Anal. Calcd. for: $C_{16}H_{21}O_2N_4$: C, 65.75; H, 4.14; N, 19.17.

Found: C. 66,01; H, 4.33; N, 18.79.

EXAMPLES 3–14

The procedures of Example 2, parts A, B, C and E were repeated starting with twelve different 1,4-disubstituted benzenes. These starting materials were as represented in Table I.

TABLE I

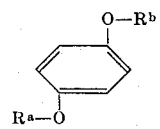

| Ex. | Disubstituted benzene | |
|---|---|---|
| | $R^a$ | $R^b$ |
| 3 | isopropyl | isopropyl |
| 4 | isobutyl | isobutyl |
| 5 | butyl | butyl |
| 6 | isopentyl | isopentyl |
| 7 | methyl | ethyl |
| 8 | methyl | isopropyl |
| 9 | methyl | isobutyl |
| 10 | methyl | isopentyl |
| 11 | methyl | decyl |
| 12 | methyl | β-methoxyethyl |
| 13 | methyl | β-ethoxyethyl |
| 14 | methyl | carboxymethyl |

By the procedure of Part A of Example 2 these starting materials of Table I were converted respectively to the corresponding dichlorides of the formula

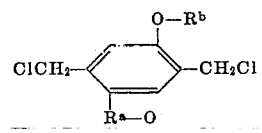

The properties of the dichlorides are summarized in Table II.

TABLE II

| Example | Yield, percent | M.P., °C. | Formula of dichloride | Carbon, percent Calcd. | Carbon, percent Found | Hydrogen, percent Calcd. | Hydrogen, percent Found | Nitrogen, percent Calcd. | Nitrogen, percent Found |
|---|---|---|---|---|---|---|---|---|---|
| 3 | 75 | 58–59 | $C_{14}H_{20}O_2Cl_2$ | 57.74 | 58.30 | 6.92 | 7.14 | 24.35 | 23.86 |
| 4 | 54 | 97–09 | $C_{16}H_{24}O_2Cl_2$ | 60.19 | 60.58 | 7.58 | 7.69 | 22.21 | 22.23 |
| 5 | 60 | 85–86 | $C_{16}H_{24}O_2Cl_2$ | 60.19 | 60.45 | 7.58 | 7.66 | 22.21 | 22.13 |
| 6 | 76 | 89–91 | $C_{18}H_{28}O_2Cl_2$* | | | | | | |
| 7 | 68 | 132–133 | $C_{11}H_{14}O_2Cl_2$* | | | | | | |
| 8 | 63 | 92–95 | $C_{12}H_{16}O_2Cl_2$* | | | | | | |
| 9 | 80 | 102–105 | $C_{13}H_{18}O_2Cl_2$* | | | | | | |
| 10 | 83 | 84–86 | $C_{14}H_{20}O_2Cl_2$* | | | | | | |
| 11 | 70 | 71–73 | $C_{19}H_{30}O_2Cl_2$* | | | | | | |
| 12 | 66 | 104–106 | $C_{12}H_{16}O_3Cl_2$* | | | | | | |
| 13 | 67 | 88–89 | $C_{13}H_{18}O_3Cl_2$* | | | | | | |
| 14 | 90 | 158–160 | $C_{11}H_{12}O_4Cl_2$ | 47.33 | 47.03 | 4.33 | 4.39 | 25.41 | |

*NMR spectrum agreed with formula.

By the procedure of part B of Example 2 the dichlorides noted in Table II were converted respectively to the corresponding dicyanides of the formula

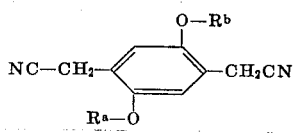

The properties of the dicyanides are summarized in Table III.

ly to the corresponding dimethyl α, α, α', α'-tetracyanodiacetates of the formula

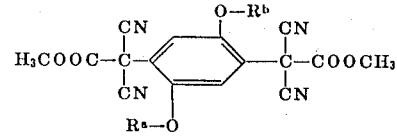

The properties of the diacetates are summarized in Table IV. The NMR spectra of the analyzed products agreed with the proposed structures.

TABLE III

| Example | Yield, percent | M.P., °C. | Formula of dicyanide | Carbon, percent Calcd. | Carbon, percent Found | Hydrogen, percent Calcd. | Hydrogen, percent Found | Nitrogen, percent Calcd. | Nitrogen, percent Found |
|---|---|---|---|---|---|---|---|---|---|
| 3 | 75 | 134–136 | $C_{17}H_{20}O_2N_2$ | 70.56 | 70.49 | 7.40 | 7.53 | 10.29 | 10.19 |
| 4 | 82 | 137–139 | $C_{18}H_{24}O_2N_2$ | 71.97 | 72.01 | 8.05 | 7.62 | 9.33 | 9.38 |
| 5 | 90 | 107–108 | $C_{18}H_{24}O_2N_2$ | 71.97 | 72.08 | 8.05 | 7.80 | 9.33 | 9.35 |
| 6 | 89 | 127–129 | $C_{20}H_{28}O_2N_2$ | 73.13 | 73.44 | 8.59 | 8.72 | 8.53 | 8.59 |
| 7 | 80 | 155–157 | $C_{13}H_{14}O_2N_2$ | 67.81 | 67.74 | 6.13 | 6.09 | 12.17 | 12.04 |
| 8 | 78 | 125–127 | $C_{10}H_{16}O_2N_2$ | 68.83 | 69.07 | 6.60 | 6.60 | 11.47 | 11.40 |
| 9 | 82 | 111–112 | $C_{15}H_{18}O_2N_2$ | 69.74 | 69.85 | 7.02 | 7.09 | 10.85 | 11.16 |
| 10 | 58 | 116–117 | $C_{16}H_{20}O_2N_2$ | 70.56 | 70.60 | 7.40 | 7.65 | 10.29 | 10.21 |
| 11 | 70 | 98–100 | $C_{21}H_{30}O_2N_2$ | 73.64 | 73.36 | 8.83 | 8.55 | 8.18 | 8.09 |
| 12 | 86 | 109–111 | $C_{14}H_{18}O_3N_2$ | 64.60 | 64.68 | 6.20 | 6.66 | 10.76 | 10.72 |
| 13 | 73 | 92–93 | $C_{15}H_{18}O_3N_2$ | 65.67 | 65.70 | 6.61 | 6.27 | 10.21 | 9.99 |
| 14 | 30 | 182–183 | $C_{13}H_{12}O_4N_2$ | 59.99 | 59.79 | 4.65 | 4.50 | 10.77 | 10.53 |

By the procedure of Part C of Example 2 the dicyanides described in Table III were converted respectively By the procedure of Part E of Example 2 the diacetates described in Table IV were converted

TABLE IV

| Example | Yield, percent | M.P., °C. | Formula of diacetate | Carbon, percent Calcd. | Carbon, percent Found | Hydrogen, percent Calcd. | Hydrogen, percent Found | Nitrogen, percent Calcd. | Nitrogen, percent Found |
|---|---|---|---|---|---|---|---|---|---|
| 3 | 59 | 184–186 | $C_{22}H_{22}O_6N_4$ | 60.27 | 60.47 | 5.06 | 4.88 | 12.78 | 12.60 |
| 4 | 69 | 202–204 | $C_{24}H_{26}O_6N_4$ | 61.79 | 61.32 | 5.62 | 5.61 | 12.01 | 12.13 |
| 5 | 43 | 127–129 | $C_{24}H_{26}O_6N_4$ | 61.79 | 61.47 | 5.62 | 5.18 | 12.01 | 11.84 |
| 6 | 64 | 147–149 | $C_{26}H_{30}O_6N_4$ | 63.14 | | 6.11 | | 11.33 | |
| 7 | 70 | 143–144 | $C_{19}H_{16}O_6N_4$ | 57.57 | 57.27 | 4.07 | 3.80 | 14.14 | 14.13 |
| 8 | 63 | 144–147 | $C_{20}H_{18}O_6N_4$ | 58.53 | 58.28 | 4.42 | 4.34 | 13.65 | 13.44 |
| 9 | 51 | 108–109 | $C_{21}H_{20}O_6N_4$ | 59.43 | 59.06 | 4.75 | 4.78 | 13.20 | 13.11 |
| 10 | 73 | 104–105 | $C_{22}H_{22}O_6N_4$ | 60.27 | 60.14 | 5.06 | 5.06 | 12.78 | 12.84 |
| 11 | 68 | 95–96 | $C_{27}H_{32}O_6N_4$ | 63.76 | 63.86 | 6.34 | 6.38 | 11.02 | 11.00 |
| 12 | 55 | 99–101 | $C_{20}H_{18}O_7N_4$ | 56.33 | 56.19 | 4.26 | 4.37 | 13.14 | 13.17 |
| 13 | 65 | 99–100 | $C_{21}H_{20}O_7N_4$ | 57.27 | 57.21 | 4.58 | 4.50 | 12.72 | 12.61 |
| 14 | | | $C_{19}H_{14}O_8N_4$ | | | | | | |

TABLE V

| Example | Yield, percent | M.P., °C. | Formula of quinodimethan | Carbon, percent Calcd. | Carbon, percent Found | Hydrogen, percent Calcd. | Hydrogen, percent Found | Nitrogen, percent Calcd. | Nitrogen, percent Found |
|---|---|---|---|---|---|---|---|---|---|
| 3 | 94 | 195–196 | $C_{18}H_{16}O_2N_4$ | 67.48 | 67.39 | 5.30 | 5.12 | 17.49 | 17.48 |
| 4 | 90 | 235–238 | $C_{20}H_{20}O_2N_4$ | 68.95 | 69.07 | 5.79 | 6.02 | 16.08 | 16.32 |
| 5 | 83 | 184–186 | $C_{20}H_{20}O_2N_4$ | 68.95 | 69.19 | 5.79 | 5.75 | 16.08 | 16.04 |
| 6 | 88 | 208–210 | $C_{22}H_{24}O_2N_4$ | 70.18 | 70.53 | 6.43 | 6.71 | 14.88 | 15.03 |
| 7 | 96 | 243–244 | $C_{15}H_{10}O_2N_2$ | 64.74 | 64.44 | 3.62 | 3.63 | 20.14 | 20.14 |
| 8 | 93 | 193–195 | $C_{16}H_{12}O_2N_4$ | 65.75 | 66.12 | 4.14 | 4.09 | 19.17 | 19.39 |
| 9 | 91 | 219–220 | $C_{17}H_{14}O_2N_4$ | 66.65 | 66.66 | 4.61 | 4.66 | 18.29 | 18.34 |
| 10 | 92 | 228–230 | $C_{18}H_{16}O_2N_4$ | 67.48 | 67.28 | 5.03 | 5.06 | 17.49 | 17.48 |
| 11 | 92 | 180–182 | $C_{23}H_{28}O_2N_4$ | 70.74 | 70.97 | 6.71 | 6.60 | 14.35 | 14.56 |
| 12 | 96 | 188–190 | $C_{16}H_{12}O_3N_4$ | 62.33 | 62.01 | 3.92 | 3.91 | 18.18 | 18.11 |
| 13 | 92 | 188–190 | $C_{17}H_{14}O_3N_4$ | 63.35 | 63.15 | 4.38 | 4.44 | 17.38 | 17.31 |
| 14 | 52 | 250–255 | $C_{15}H_8O_4N_4$ | 58.44 | 58.50 | 2.62 | 2.79 | 18.18 | 18.31 | respectively first to the corresponding dihydro intermediates which then without isolation were oxidized to the corresponding quinodimethans of the formula

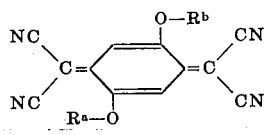

The properties of the quinodimethans are summarized in Table V.

EXAMPLE 15

7,7,8,8-TETRACYANO-2,5-DIMETHOXYQUINODIMETHAN

Part A Preparation of Dimethyl $\alpha$, $\alpha$, $\alpha'$, $\alpha'$-Tetracyanodimethoxy-1,4-phenylenediacetate A mixture of 10.8 parts of 2,5-dimethoxy-1,4-xylylene dicyanide, 8 parts of sodium methylate, and 75 parts of dimethyl carbonate was refluxed with mechanical stirring for 0.5 hour. Benzene (100 parts total) was then added in four equal portions at 15-minute intervals while maintaining the reflux. After refluxing for an additional period of 1.5 hours, the benzene/methanol binary was removed during the course of 1.5 hours. Distillation was continued for an additional 0.5 hour to make sure all of the benzene/methanol binary was removed, during which time essentially pure benzene distilled over. The resulting thick yellow suspension of the disodium derivative of dimethyl $\alpha$, $\alpha'$-dicyano-2,5-dimethoxy-1,4-phenylenediacetate was cooled to 5° C. Cyanogen chloride (18 parts) was then distilled into the thick suspension, maintained at a temperature of 5°–10 C. by suitable external cooling. When the addition of the cyanogen chloride was completed, the temperature of the reaction mixture was raised to 65° C. over a period of one hour. The reaction mixture was then allowed to cool to room temperature and stirring was continued under these conditions for 15 hours. The essentially colorless, neutral reaction mixture was evaporated to dryness under reduced pressure and the resulting solid mixture of dimethyl $\alpha$, $\alpha$, $\alpha'$, $\alpha'$-tetracyano-2,5-dimethoxy-1,4-phenylenediacetate and sodium chloride was stirred with cold water to dissolve the latter. The solid precipitate of the diacetate was collected by filtration, washed well with cold water, air-dried, and finally dried over phosphorus pentoxide under reduced pressure. There was thus obtained 19 parts (100percent of theory) of dimethyl $\alpha$, $\alpha$,- $\alpha'$, $\alpha'$-tetracyano-2,5-dimethoxy-1,4-phenylenediacetate.

Part B Preparation of 7,7,8,8-Tetracyano-2,5-dimethoxyquinodimethan

To five parts of a 10percent aqueous solution of potassium hydroxide was added 0.5 part of the above dimethyl, $\alpha$, $\alpha$, $\alpha'$, $\alpha'$-tetracyano-2,5-dimethoxy-1,4-phenylenediacetate and the resulting mixture was warmed with stirring on a steam bath for a few seconds whereupon a homogeneous solution was obtained. The solution was acidified by the addition of two parts of aqueous 6N hydrochloric acid whereupon carbon dioxide was evolved and 1,4-bis(dicyanomethyl)-2,5-dimethoxybenzene precipitated as a colorless solid. About 200 parts of a saturated aqueous solution of bromine was then added and the mixture was stirred for about 10 minutes, during which time the colorless dihydro compound was oxidized to the orange-colored quinodimethan. The colored product was collected by filtration, washed thoroughly with cold water, and crystalized from methylene chloride to give pure 7,7,8,8-tetracyano-2,5-dimethoxyquinodimethan as deep red crystals melting at 305° C. with decomposition and exhibiting an IR spectrum consistent with the tetracyanodimethoxyquinodimethan structure.

Anal. Calcd. for $C_{14}H_8O_2N_4$: C, 63.6%, H, 3.0%; N, 21.2%

Found: C, 63,3%, H, 2.8%; N, 21.2%

EXAMPLE 16

6-METHOXY-2,3(methylenedioxymethylene)-7,7,8,8-TETRACYANOQUINODIMETHAN

Part A 5,8-Bis(chloromethyl)-6-methoxy-1,3-benzodioxan

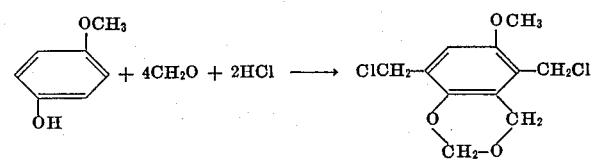

Into a mechanically stirred mixture of 60 g of paraformaldehyde 225 ml. of concentrated hydrochloric acid cooled in an ice-water mixture was passed dry hydrogen chloride until the solution was saturated at 5° C. A solution of 37 g. of p-methoxyphenol in 50 ml. of dioxane was added dropwise during the course of 4 hours, the temperature being maintained at 5° C. and the reaction mixture saturated with hydrogen chloride at this temperature. The temperature of the reaction mixture was allowed to increase to 25° C. during the course of 3 hours and stirred at 25°C. for an additional period of 48 hours. The thick reaction mixture was diluted with water, the precipitate was collected and washed with cold water. The moist filter cake was dissolved in methylene chloride. The organic layer was separated, dried with anhydrous magnesium sulfate and concentrated to a small volume. Diethyl ether was added whereupon colorless crystals separated. The crystals were collected, washed with ether and crystallized twice from methylene chloride-methanol to give 30 g. (40%) of colorless) crystals, m.p. 146°–147° C. n.m.r. spectrum of a solution of the dichloride in deuterated chloroform agreed with the above structure.

Anal. Calcd. for: $C_{11}H_{12}O_3Cl_2$: C, 50.21; H, 4.60; Cl, 26.95

Found: C, 50.31; H, 4.61; Cl, 26.55.

Part B 6-Methoxy-1,3-benzodioxan-5,8-diacetonitrile

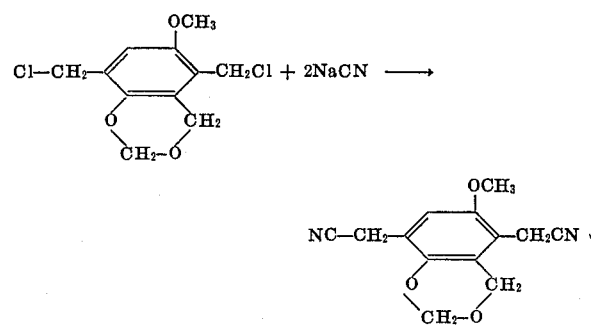

To a mechanically stirred suspension of 15 g. (0.3 mole) of powdered sodium cyanide in 50 ml. of dimethyl sulfoxide at 50° C., was added slowly in portions 22 g. of 5,8-bis-(chloromethyl-6-methoxy-1,3-benzodioxan, the temperature being maintained at 50°–52 C. by controlling the rate of addition of the dichloride and by means of external cooling. The reaction mixture was stirred an additional 15 minutes at 50° C. during which time crystals of the 6-methoxy-1,3-benzodioxan-5,8-diacetonitrile separated. The thick reaction mixture was diluted to 500 ml. with cold water, the dinitrile was collected and washed with cold water until the filtrate was neutral (ph about 7). The moist filter cake was dissolved in about 200 ml. of methylene chloride, the layers were separated and the organic layer was dried with anhydrous magnesium sulfate. After filtration, the filtrate was concentrated to a volume of about 75 ml. whereupon crystals of the dinitrile separated. Anhydrous ether was added slowly and the concentration was continued until most of the methylene chloride had been displaced. After cooling, the colorless crystals of dinitrile were collected, washed with ether, and dried. The yield of product melting at 168°—171° C. was 18.6 g. (90 percent). Crystallization from methylene chloride-ether gives crystals melting at 168°–170° C.

Anal. Calcd. for: $C_{13}H_{12}O_3N_2$: C, 63.92; H, 4.95; N, 11.47

Found: C, 63.57; H, 4.59; N, 11.17.

Part C Dimethyl $\alpha, \alpha, \alpha', \alpha'$-tetracyano-6-methoxy-1,3-benzodioxan-5,8-diacetate

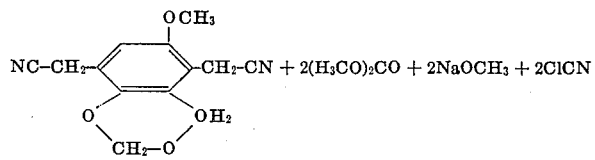

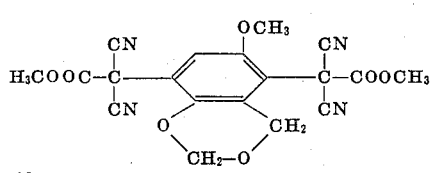

A mechanically stirred mixture of 18 g. of 6-methoxy-1,3-benzodioxan-5,8-diacetonitrile, 100 ml. of dimethyl carbonate and, 10.6 g. of sodium methoxide was stirred under an atmosphere of nitrogen until the exothermic reaction had ceased, (temperature rose to 45° C.). Benzene (35 ml.) was added and the reaction mixture was refluxed with vigorous stirring for 4 hours. The benzene-methanol binary was removed by distillation during the course of 1 hour, additional benzene being added as required. The suspension of the disodium derivative of dimethyl-$\alpha$, $\alpha$-dicyano-6-methoxy-1,3-benzodioxan-5,8-diacetate was cooled to 15° C. and 15 ml. of cyanogen chloride was distilled into the reaction mixture at 15° C. After the exothermic reaction had ceased, the temperature was allowed to increase to 25° C. and then slowly increased to 50° C. The reaction mixture was evaporated to dryness under reduced pressure in a bath at 60°–65° C. Methylene chloride and water were added to the resulting solid material, the organic layer was separated, dried with anhydrous magnesium sulfate and the filtrate was concentrated to a small volume. Addition of ether and a small amount of methanol gave 20 g. (65 percent) of the tetracyano diester, m.p. 160°–163° C. Recrystallization from methylene chloride-ether gave colorless crystals, m.p. 162°–164° C.

Anal. Calcd. for: $C_{19}H_{14}O_7N_4$: C, 55.61; H, 3.44; N, 13.66

Found: C, 55.31; H, 3.31; N, 13.38.

Part D 5,8-Dihydro-6-methoxy-1,3-benzodioxan-$\Delta^{5,\alpha:8,\alpha'}$-dimalononitrile

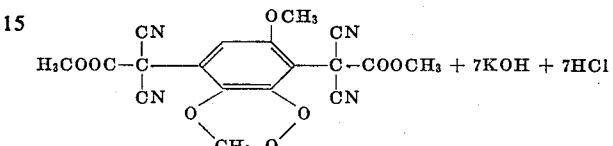

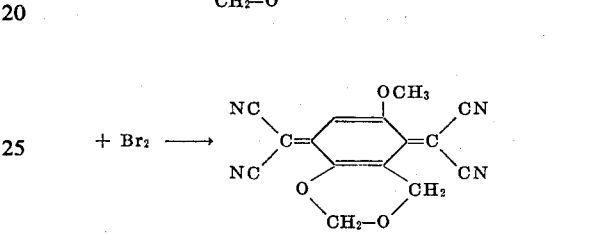

To warm solution of 4.10 g. of the above tetracyano diester in 6 ml. of dioxane were added rapidly in one portion 40 ml. of an aqueous 10 percent potassium hydroxide solution heated to 75°–80° C. The resulting solution was stirred for 1 minute, cooled to 25° C. by the addition of ice and filtered. The resulting filtrate was acidified by the addition of 13 ml. of 6N hydrochloric acid. To the resulting nearly colorless precipitate was added an excess of bromine water and the resulting reaction mixture was stirred for 15 minutes. The deep red product was collected by suction filtration, washed thoroughly with cold water and the moist filter cake was dissolved in methylene chloride. The organic layer was separated, dried with anhydrous magnesium sulfate and the deep red filtrate was concentrated to a volume of about 75 ml. whereupon deep red crystals separated. Continuing the concentration, anhydrous ether was added at such a rate as to keep the volume essentially constant. After essentially all of the methylene chloride had been displaced, the deep red crystals were collected, washed with ether and dried. The yield of deep red crystals, melting above 400° C., was 2.8 g. (97%)

Anal. Calcd. for: $C_{15}H_8O_3N_4$: C, 61.64; H, 2.76; N, 19.17

Found: C, 61.38; H, 2.82; N, 19.12.

The product of Part D of Example 16 may also be named as 6-methoxy-1,3-benzodioxan-$\Delta^{5(8H),\alpha:8,\alpha'}$-dimalononitrile or as 6-methoxy-2,3-(methylenedioxymethylene)-7,7,8,8-tetracyanoquinodimethan. In Table VI below the latter form has been used k naming related compounds, but the other two forms could also be used.

In addition to the foregoing detailed exemplary disclosure, the process of the present invention is broadly applicable to many other specific compounds. Suitable specific compounds further illustrative of the generic scope of this invention follow. In all instances the process conditions and stoichiometry are those discussed in detail in the foregoing Examples. Thus, from 2-butoxycarbonyl-p-xylylene dicyanide, lithium methoxide, dioctyl carbonate, cyanogen bromide and aqueous base and acid, there will be obtained dioctyl 2-butoxycarbonyl-1,4-phenylenebis(cyanoacetate), from which is obtained 2-butoxycarbonyl-1,4-phenylenedimalononitrile from which on oxidation will be obtained 2-butoxycarbonyl-7,7,8,8-tetracyanoquinodimethan.

Similarly, using 2-phenylmercapto-p-xylene dicyanide, cesium methylate, diphenyl carbonate, aqueous base and acid, there will be obtained diphenyl 2-phenylmercapto-1,4-phenylenebis(cyanoacetate) and 2-phenylmercapto-1,4-phenylenediamononitrile, which on oxidation yields 2-phenylmercapto-7,7,8,8-tetracyanoquinodimethan.

Similarly, from 2-vinyloxy-p-xylylene dicyanide, sodium methoxide, dimethyl carbonate, and cyanogen chloride and aqueous base and acid, there will be obtained dimethyl 2-vinyloxy-1,4-phenylenebis(cyanoacetate) and 2-vinyloxy-1,4-phenylenedimalononitrile, which on oxidation yields 2-vinyloxy-7,7,8,8-tetracyanoquinodimethan.

As shown in Examples 1–14, the substituted diacetonitrile starting materials for the process of this invention are prepared from the corresponding substituted aromatic compounds. When the procedures of Parts A, B, C and E of Example 1 are repeated starting with the substituted aromatic compounds shown in Table VI in place of p-dimethoxybenzene, the indicated substituted tetracyanoquinodimethans are obtained.

TABLE VI

1. From 1,2,4,5-tetramethoxybenzene is formed

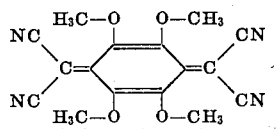

2,3,5,6-Tetramethoxy-7,7,8,8-tetracyanoquinodimethan.

2. From 1,2,4,5-tetraethoxybenzene is formed

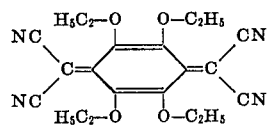

2,3,5,6-Tetraethoxy-7,7,8,8-tetracyanoquinodimethan.

3. From 4-propoxytoluene is formed

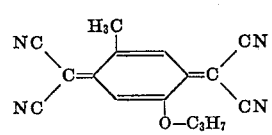

5-Methyl-2-propoxy-7,7,8,8-tetracyanoquinodimethan.

4. From 2,2′, 3,3 -tetramethoxybiphenyl is formed

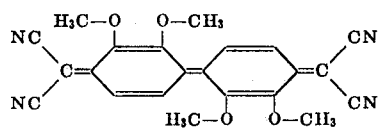

2,2′, 3,3′-Tetramethoxy-7,7,7′, 7′-tetracyanodipheno-4,4′-quinodimethan.

5. From 2-ethoxytoluene is formed

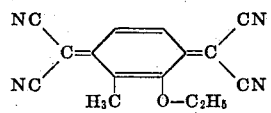

2-Ethoxy-3-methyl-7,7,8,8-tetracyanoquinodimethan.

6. From p-chloroanisole is formed

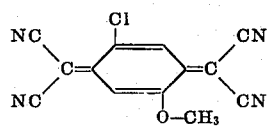

5-Chloro-2-methoxy-7,7,8,8-tetracyanoquinodimethan.

7. From p-fluoroanisole is formed

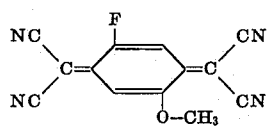

5-Fluoro-2-methoxy-7,7,8,8-tetracyanoquinodimethan.

8. From p-bromoanisole is formed

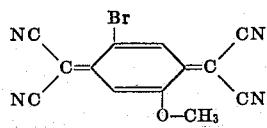

5-Bromo-2-methoxy-7,7,8,8-tetracyanoquinodimethan.

9. From p-iodoanisole is formed

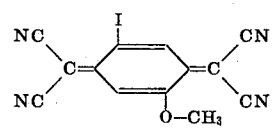

5-Iodo-2-methoxy-7,7,8,8-tetracyanoquinodimethan.

10. From 3,4-dimethoxybenzyl chloride is formed

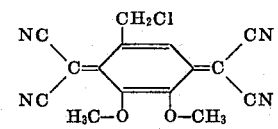

5-Chloromethyl-2,3-dimethoxy-7,7,8,8-tetracyanoquinodimethan.

11. From 4-ethoxystyrene is formed

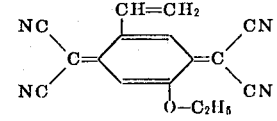

2-Ethoxy-5-vinyl-7,7,8,8-tetracyanoquinodimethan.
12. From 4-phenoxystyrene is formed

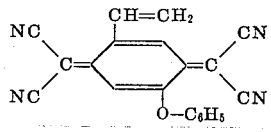

2-Phenoxy-5-vinyl-7,7,8,8-tetracyanoquinodimethan.
13. From 3,4-dimethoxybenzonitrile is formed

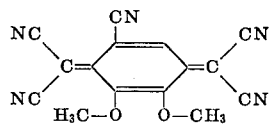

5-Cyano-2,3-dimethoxy-7,7,8,8-tetracyanoquinodimethan.
14. From p-propoxyphenyl cyanide is formed

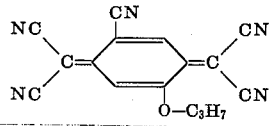

5-Cyano-2-propoxy-7,7,8,8-tetracyanoquinodimethan.
15. From isoamyl 2-naphthyl ether is

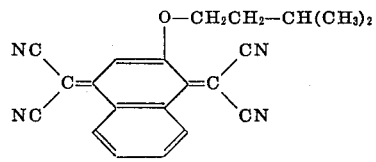

2-Isoamyloxy-11,11,12,12-tetracyanonaphtho-1,4-quinodimethan.
16. From -Isoamyl 1-naphthyl ether is formed

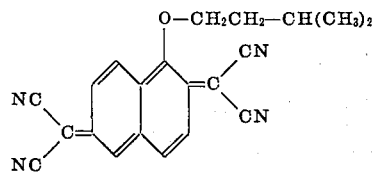

1-Isoamyloxy-11,11,12,12,-tetracyanonaphtho-2,6-quinodimethan.
17. From methyl phenyl sulfide is formed

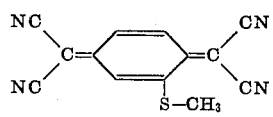

2-Methylthio-7,7,8,8-tetracyanoquinodimethan.
18. From phenyl t-butyl sulfide is formed

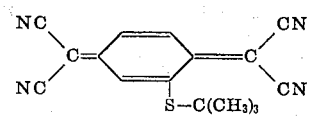

2-t-Butylthio-7,7,8,8-tetracyanoquinodimethan.
19. From β-naphthyl methyl sulfide is formed

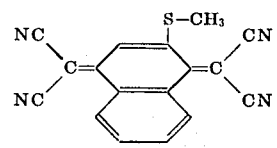

2-Methylthio-11,11,12,12,-tetracyanonaphtho-1,4-quinodimethan.
20. From 2-methylthio-9,10-diphenylanthracene is formed

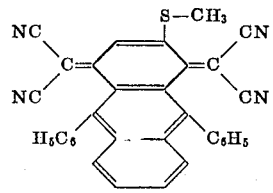

9,10-Diphenyl-2-methylthio-15,15,16,16-tetracyanoanthra-1,4-quinodimethan.
21. From 1,4-diethoxy-9,10-diphenylanthracene is formed

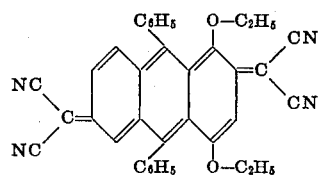

1,4-Diethoxy-9,10-diphenyl-15,15,16,16-tetracyanoanthra-2,6-quinodimethan.
22. From 1,5-dimethoxyanthracene is formed

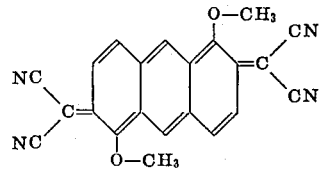

1,5-Dimethoxy-15,15,16,16-tetracyanoanthra-2,6-quinodimethan.
23. From 1,4-dimethoxynaphthalene is formed

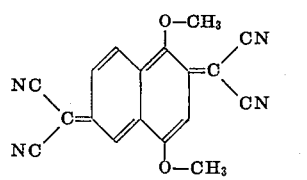

1,4-Dimethoxy-11,11,12,12,-tetracyanonaphtho-2,6-quinodimethan
24. From 4-methoxy-5-(1-naphthylsulfonyl)-1-(phenylsulfonyl)-naphthalene is formed

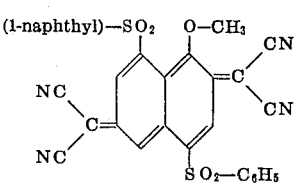

1-Methoxy-8-(1-naphthylsulfonyl)-4-phenylsulfonyl- 11,11,12,12-tetracyanonaphtho-2,6-quinodimethan.
25. From 1-(chloromethyl)-2-methoxynaphthalene is formed

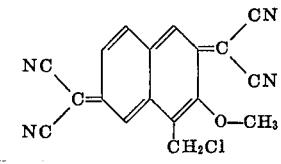

4-(Chloromethyl)-3-methoxy-11,11,12,12tetra-cyanonaphtho-2,6-quinodimethan.
26. From 2-methyl-4(p-tolylsulfonyl)anisole is formed

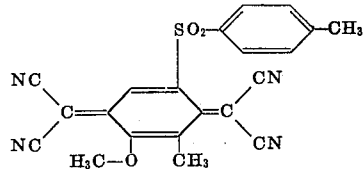

3-Methoxy-2-methyl-6-(p-tolylsulfonyl)-7,7,8,8-tetra-cyanoquinodimethan.
27. From N,N-dimethyl-p-anisamide is formed

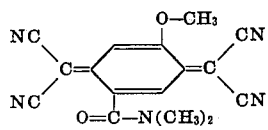

5-(N,N-Dimethylcarbamoyl)-2-methoxy-7,7,8,8-tetra-cyanoquinodimethan.
28. From o-butoxybenzamide is formed

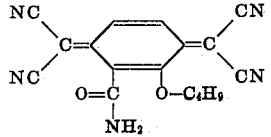

3-Carbamoyl-2-butoxy-7,7,8,8-tetracyanoquin-odimethan.
29. From N-N-diethyl-2,4-dimethoxybenzamide is formed

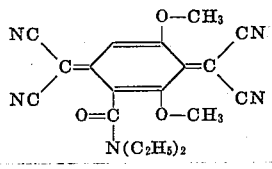

3-(N,N-Diethylcarbamoyl)-2,6-dimethoxy-7,7,8,8-tetracyanoquinodimethan.
30. From 2,4-dimethoxydiphenyl sulfone is formed

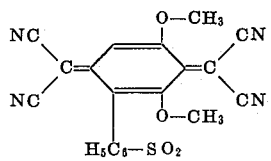

2,6-Dimethoxy-3-phenylsulfonyl-7,7,8,8-tetra-cyanoquinodimethan.
31. From p-bis(propoxymethoxy)benzene is formed

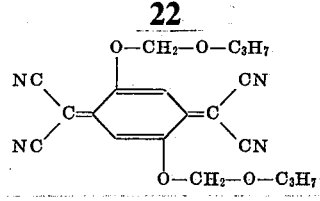

2,5-Bis(propoxymethoxy)-7,7,8,8-tetracyanoquin-odimethan.
32. From 1,2-(dimethylmethylenedioxy) benzene is formed

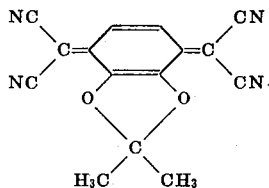

2,3-(Dimethylmethylenedioxy)- 7,7,8,8-tetra-cyanoquinodimethan.
33. From 1,3-benzenedioxole-2-carboxylic acid is formed

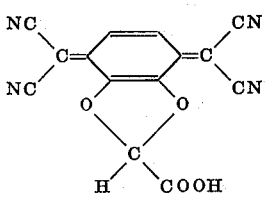

2,3-(Carboxymethylenedioxy)-7,7,8,8-tetracyanoquin-odimethan.
34. from 2-methyl-1,4-benzodioxan is formed

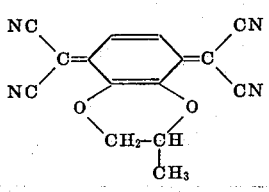

2,3-(propylenedioxy)-7,7,8,8-tetracyanoquin-odimethan.
35. From 6-methoxy-1,4-benzodioxan is formed

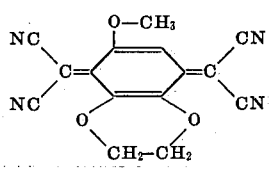

2,3-(Ethylenedioxy)-5-methoxy-7,7,8,8-tetra-cyanoquinodimethan.
36. From 2,3-diethoxy-1,4-benzodioxan is formed

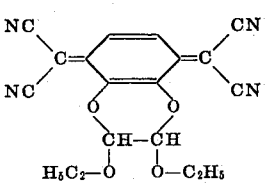

2,3(1,2-Diethoxyethylenedioxy)-7,7,8,8-tetra-cyanoquinodimethan.
37. From 6-t-butyl-1,3-benzodioxan is formed

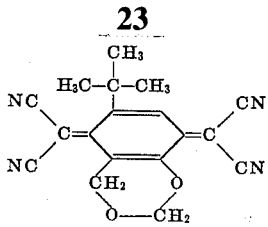

6-t-Butyl-2,3(methylenedioxymethylene)-7,7,8,8-tetracyanoquinodimethan.

38. From 2,4-bis(trichloromethyl)-1,3-benzodioxan is formed

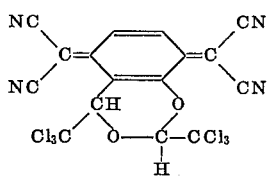

2,3-(2,2,2-Trichloroethylidenedioxy-2,2,2-trichloroethylidene)-7,7,8,8-tetracyanoquinodimethan.

39. From 2-phenyl-1,3-benzodioxan is formed

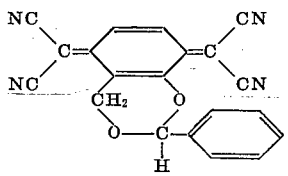

2,3-(Benzylidenedioxymethylene)-7,7,8,8-tetracyanoquinodimethan.

40. From 2-(p-bromophenyl)-6-methyl-1,3-benzodioxan is formed

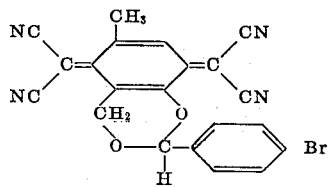

6-Methyl-2,3-(p-bromobenzylidenedioxymethylene)-7,7,8,8-Tetracyanoquinodimethan.

41. From 2,4-dimethyl-1,3-benzodioxan is formed

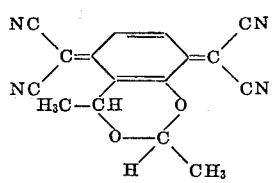

2,3-(Ethylidenedioxyethylidene)-7,7,8,8-tetracyanoquinodimethan.

EXAMPLE 17

2-ETHOXY-5-METHYLTHIO-7,7,8,8-TETRACYANOQUINODIMETHAN

Part A 4-Methylthiophenetole

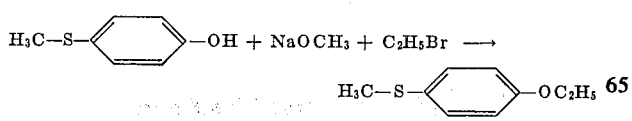

To a mechanically stirred solution of 28 g. of sodium methoxide in 200 ml. of methanol was added 70 g. of p-methylthiophenol. The resulting solution was heated to reflux under an atmosphere of nitrogen and 60 g. of ethyl bromide was added dropwise at such a rate that the temperature of the reaction mixture did nOt drop below about 65° C. The addition required about 1 hr. and the reaction mixture was refluxed for a total of 3 hrs. The methanol was removed by distillation under reduced pressure, about 200 ml. of 5percent potassium hydroxide was added followed by the addition of diethyl ether. The aqueous layer was separated and extracted 3 times with ether. The combined ether extracts were dried with anhydrous magnesium sulfate. The drying agent was removed by filtration and the filtrate was fractionated. The yield of p-methylthiophenetole boiling at 135° C. at 18 mm. was 74 g. (88percent). The n.m.r. spectrum showed an $A_2B_2$ quadruplet centered at 6.88 ppm. (4 aromatic protons), a quadruplet centered at 3.95 ppm.(—O—$CH_2$,2Oprotons), a singlet at 2.27 ppm. (—$SCH_3$, 3 protons), and a triplet centered at 1.25 ppm. (—$CH_3$ of —$CH_2CH_3$, 3 protons) (tetramethylsilicone internal standard).

Part B 2-Ethoxy-5-methylthio-1,4-xylylene Dichloride

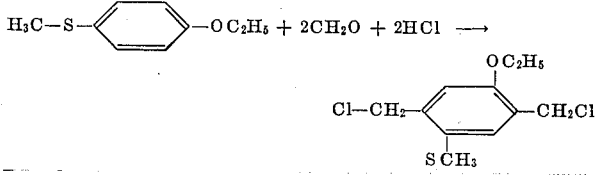

Dry hydrogen chloride was passed into a vigorously stirred mixture of 50 g. of 4-methylthiophenetole, 40 g. of paraformaldehyde and 250 ml. of concentrated hydrochloric until the reaction mixture was saturated at 50° C., The reaction mixture was stirred for a total of 6 hrs. at 50° C., during which time a slow stream of dry hydrogen chloride was introduced. The reaction mixture was diluted to about 1 liter with cold water. This solid reaction product was collected, washed thoroughly with cold water and dissolved in methylene chloride. The organic layer was separated, dried with anhydrous magnesium sulfate and concentrated to a small volume, during which time crystals separated. Diethyl ether was added at such a rate as to maintain the volume constant until essentially all of the methylene chloride had been displaced. The resulting crystals of 2-ethoxy-5-methylthio-1,4-xylylene dichloride were collected, washed with cold ether, pentane and dried. The yield of crystals melting at 130°–132° C. was 43 g. (54percent). Recrystallization from methylene chloride ether gave crystals melting at 132°–133° C. The n.m.r. spectrum of a solution of the compound in $CDCl_3$ was in agreement with the above formula.

Anal. Calcd. for: $C_{11}H_{14}OSCl_2$:C, 49.82; H, 5.32; Cl, 26.74

Found: C, 49.86; H, 5.031; Cl, 26.72

Part C 2-Ethoxy-5-methylthio-1,4-xylylene Dicyanide

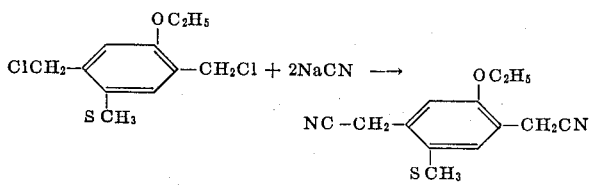

To a mechanically stirred mixture of 20 g. of sodium cyanide and 100 ml. of dimethylsulfoxide was added in small portions 40 g. of 2-ethoxy-5-methylthio-1,4-xylylene dichloride at 50°–55° C., the temperature being maintained in this range by controlling the rate of addition and by means of external cooling. The resulting reaction mixture was stirred at 50°–55° C. for an additional period of 30 min., diluted to a volume of about 500 ml. with cold water, the solid reaction product was collected by filtration and washed thoroughly with cold water. The moist filter cake was dissolved in methylene chloride. The organic layer was separated, dried, concentrated to a small volume and diethyl ether was added slowly whereupon crystals of the 2-ethoxy-5-methylthio-1,4-xylylene dicyanide separated. The yield of crystals melting at 144°–145° C. was 36 g. (100percent). Two recrystallizations from methylene chloride-ether gave crystals melting at 160°–161° C.

Anal. Calcd. for: $C_{13}H_{14}OSN_2$: c. 63.39; H, 5.73; N, 11.37

Found: C, 63.02; H, 6.07; N, 11.38

Part D Dimethyl α, α, α′, α′-Tetracyano-2-ethoxy-5-methylthio-1,4-phenylenediacetate

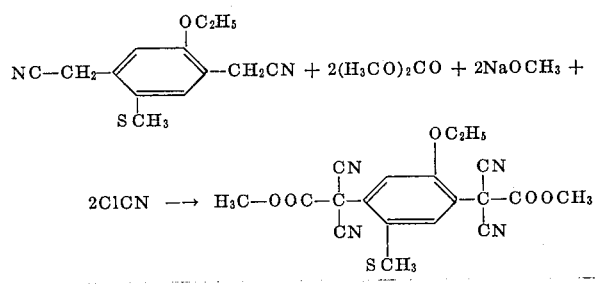

A mechanically stirred mixture of 32 g. of 2-ethoxy-5-methylthio-1,4-xylylene dicyanide, 100 ml. of dimethyl carbonate and 16 g. of sodium methoxide was warmed to 70° C. whereupon a homogeneous solution was obtained. After several minutes, a gum began to separate that changed to a granular solid. About 100 ml. benzene was added slowly and the reaction mixture was stirred under reflux for 4 hrs. The methanol was removed from the reaction mixture by distillation of the benzene-methanol binary, additional benzene being added as necessary. The resulting suspension of the disodium derivative of dimethyl α,α′α′-dicyano2-ethoxy-5-methylthio-1,4-phenylenediacetate was cooled to 15° C. and 20 ml. of cyanogen chloride was distilled into the stirred reaction mixture at 15°–17° C. After a slight exothermic reaction, the temperature was increased to 60° C. during the course of 1 hr. and the reaction mixture was evaporated to dryness under reduced pressure in a bath at 60° C. The resulting reaction product was stirred with ether-petroleum ether mixture, was collected by filtration and washed with pentane. After drying, the filter cake was suspended in methylene chloride, sufficient water was added to dissolve the sodium chloride, the organic layer was separated and dried with magnesium sulfate. The methylene chloride solution was concentrated to a small volume, ether was added slowly whereupon crystals of dimethyl α,α,α′,α′-tetracyano-2-ethoxy-5-methylthio-1,4-phenylenediacetate separated. The nearly colorless crystals were collected, washed with ether until the washings were essentially colorless and dried. The yield of compound melting at 138°–141° C. was 28 g. (53%)

Anal. Calcd. for: $C_{19}H_{18}O_5SN_4$: C, 55.34; H, 3.91; N, 13.59

Found: C, 55.39; H, 3.99; N, 13.85

Part E  2-Ethoxy-5-methylthio-1,4-phenylenedimalononitrile

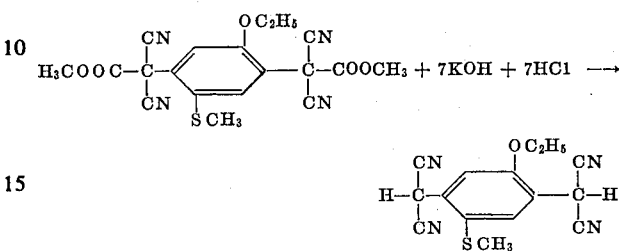

To a warm solution of 4.1 g. of dimethyl α,α,α′,α′-tetracyano-2-ethoxy-5-methylthio-1,4-phenylenediacetate in 10 ml. of dioxane was added rapidly a solution of 40 ml. of 10 percent potassium hydroxide heated to 70°–80° C. The resulting solution was stirred for about 30 seconds and cooled to 25°C. by the addition of ice. The solution was filtered and the filtrate was acidified by the addition of 26 ml. of 3 N. hydrochloric acid. The crude 2-ethoxy-3-methylthio-1,4-phenylenedimalononitrile was collected, washed with water and the moist filter cake was dissolved in methylene chloride. The organic layer was dried with anhydrous magnesium sulfate. The drying agent was removed by filtration and the filtrate was concentrated to a small volume. Anhydrous diethyl ether was added slowly, whereupon colorless crystals of the dimalononitrile separated. The crystals were collected and washed with ether. The yield of compound melting at 168–170° C. was 2.65 g. (90 percent).

Anal. Calcd. for: $C_{15}H_{12}OSN_4$: C, 60.80; H, 4.08; N, 18.91

Found: C, 60.97; H, 4.45; N, 19.07

Part F  2-Ethoxy-5-methylthio-7,7,8,8-tetracyanoquinodimethan

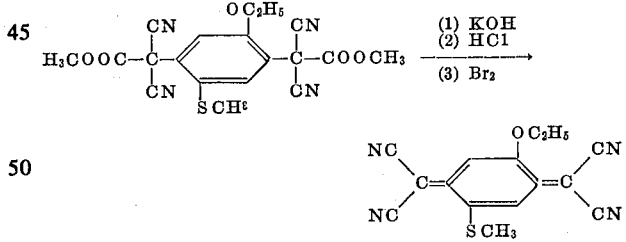

The dimethyl α,α,α′,α′-tetracyano-2-ethoxy-5-methylthio-1,4-phenylenediacetate (4.1 g.) was converted to the 2-ethoxy-5-methylthio-1,4-phenylenedimalontirile as described above and oxidized to 2-ethoxy-5-methylthio-7,7,8,8-tetracyanoquinodimethan by the addition of a slight excess of bromine water. The resulting deep brown precipitate was collected by filtration, washed with water and the moist filter cake was dissolved in methylene chloride. The organic layer was dried, concentrated to a small volume and anhydrous diethyl ether was added whereupon deep brown crystals of 2-ethoxy-5-methylthio-7,7,8,8-tetracyanoquinodimethan separated. The crystals were collected, washed with ether and dried. The yield of quinodimethan melting at 231°–233° C. with decomposition was 2.80 g. (95 percent). Addition of sodium iodine to an acetonitrile solution of the quinodimethan resulted in the rapid formation of the green ion radical.
Anal.
Calcd. for: $C_{15}H_{10}OSN_4$: C, 61.22; H, 3.43; N, 19.04; S, 10.87
Found: C, 61.55; H, 3.70; N, 18.96; S, 10.96

The substituted tetracyanoquinodimethans of this invention are readily converted to their corresponding paramagnetic charge-transfer compounds by reaction with organic or organoinorganic Lewis bases. Such charge-transfer compounds are analogous to those for the related unsubstituted compounds described in U. S. Pat. No. 3,162,641.

The substituted tetracyanoquinodimethans of this invention all form yellow colored complexes with aromatic compounds. They are thus useful for dyeing polystyrene for use in the molding, packaging and decorating arts. Such uses are illustrated as follows:

EXAMPLE A

Commercially available molding grade polystyrene (2.5 g.) was dissolved in 12.5 ml. of 1,2-dichloroethane. To the clear, colorless solution was added 0.002 g. of 2,4-diethoxytetracyanoquinodimethan (product of Example 2) with stirring for several minutes. The resulting deep yellow, homogeneous solution was cast on a glass plate under a 10-mil. doctor knife. The film was dried at 60° C. until free of solvent and removed from the plate. The resulting film was deep yellow in color and brilliantly clear. It was suitable for preparing yellow transparent boxes for packaging.

The embodiments of the invention in which an exclusive property or privilege is claimed are defined as follows:

1. A compound of the formula

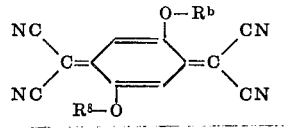

wherein $R^a$ and $R^b$ which may be the same or different are selected from the group consisting of hydrocarbyl of one to 10 carbon atoms, alkoxyloweralkyl of one to eight carbon atoms, carboxyloweralkyl of one to eight carbon atoms and vinyl.

2. The compound of claim 1 wherein $R^a = R^b =$ methyl, 7,7,8,8-Tetracyano-2,5-Dimethoxyquinodimethan.

3. The compound of claim 1 wherein $R^a = R^b =$ ethyl, 7,7,8,8-Tetracyano-2,5-Diethoxyquinodimethan.

4. The compound of claim 1 wherein $R^a = R^b =$ isopropyl, 7,7,8,8-Tetracyano-2,5-Diisopropoxyquniodimethan.

5. The compound of claim 1 wherein $R^a =$ methyl and $R^b =$ ethyl, 7,7,8,8-Tetracyano-2-Methoxy-5-Ethoxyquinodimethan.

6. The compound of claim 1 wherein $R^a =$ methyl and $R^b =$ isopropyl, 7,7,8,8-Tetracyano-2-Methoxy-5-Isopropoxyquinodimethan.

7. The compound of claim 1 wherein $R^a =$ methyl and $R^b =$ isobutyl, 7,7,8,8-Tetracyano-2-Methoxy-5-Isobutoxyquinodimethan.

8. The compound of claim 1 wherein $R^a =$ methyl and $R^b =$ isopentyl, 7,7,8,8-Tetracyano-2-Methoxy-5Isopentoxyquinodimethan.

9. The compound of claim 1 wherein $R^a =$ methyl and $R^b =$ decyl, 7,7,8,8-Tetracyano-2-Methoxy-5-Decoxyquinodimethan.

10. The compound of claim 1 wherein $R^a =$ methyl and $R^b = \beta$-methoxyethyl, 7,7,8,8-Tetracyano-2-Methoxy-5-($\beta$-Methoxyethoxy)quinodimethan.

11. The compound of claim 1 wherein $R^a =$ methyl and $R^b = \beta$-ethoxyethyl, 7,7,8,8-Tetracyano-2-Methoxy-5-($\beta$-Ethoxyethoxy)quinodimethan.

12. The compound of claim 1 wherein $R^a =$ methyl and $R^b =$ carboxymethoxy, 7,7,8,8-Tetracyano-2-Methoxy-5-(Carboxy-methoxy)quinodimethan.

13. The compound of claim 1 wherein $R^a = R^b =$ isobutyl, 7,7,8,8-Tetracyano-2,5-diisobutoxyquinodimethan.

14. The compound of claim 1 wherein $R^a = R^b =$ butyl, 7,7,8,8-Tetracyano-2,5-Dibutoxyquinodimethan.

15. The compound of claim 1 wherein $R^a = R^b =$ isopentyl, 7,7,8,8-Tetracyano-2,5-Diisopentoxyquinodimethan.

* * * * *